United States Patent
Meng et al.

(10) Patent No.: US 12,449,555 B2
(45) Date of Patent: Oct. 21, 2025

(54) CSI(TL) SCINTILLATOR CRYSTAL INCLUDING CO-DOPANTS ANTIOMY AND BISMUTH TO REDUCE AFTERGLOW, AND A RADIATION DETECTION APPARATUS INCLUDING THE SCINTILLATION CRYSTAL

(71) Applicant: LUXIUM SOLUTIONS, LLC, Hiram, OH (US)

(72) Inventors: Fang Meng, Aurora, OH (US); Peter R. Menge, Novelty, OH (US)

(73) Assignee: Luxium Solutions, LLC, Hiram, OH (US)

( * ) Notice: Subject to any disclaimer, the term of this patent is extended or adjusted under 35 U.S.C. 154(b) by 293 days.

(21) Appl. No.: 18/180,683

(22) Filed: Mar. 8, 2023

(65) Prior Publication Data

US 2023/0305174 A1  Sep. 28, 2023

Related U.S. Application Data

(60) Provisional application No. 63/269,031, filed on Mar. 8, 2022.

(51) Int. Cl.
*G01T 1/202*   (2006.01)
*C09K 11/75*   (2006.01)
(Continued)

(52) U.S. Cl.
CPC ............ *G01T 1/202* (2013.01); *C09K 11/756* (2013.01); *G01N 23/046* (2013.01); *G01N 23/083* (2013.01)

(58) Field of Classification Search
CPC ..... G01T 1/202; G01T 1/2023; C09K 11/756; G01N 23/046; G01N 23/083
See application file for complete search history.

(56) References Cited

U.S. PATENT DOCUMENTS

| | | |
|---|---|---|
| 4,806,757 A | 2/1989 | Kano et al. |
| 7,180,068 B1 | 2/2007 | Brecher et al. |

(Continued)

FOREIGN PATENT DOCUMENTS

| | | |
|---|---|---|
| CN | 103388179 B | 1/2016 |
| EP | 2746362 A1 | 6/2014 |

(Continued)

OTHER PUBLICATIONS

Nagarkar, V.V. et al., "Scintillation Properties and Applications of Reduced-Afterglow Codoped CsI:Tl," Penetrating Radiation Systems and Applications VIII, Proc. of SPIE, vol. 6707, 2007, pp. 67070D-1-67070D-6.

(Continued)

*Primary Examiner* — David P Porta
*Assistant Examiner* — Mamadou Faye
(74) *Attorney, Agent, or Firm* — Abel Schillinger, LLP; John M. Frank

(57) ABSTRACT

A scintillation crystal can include a cesium halide that is co-doped with thallium and another element. In an embodiment, the scintillation crystal can include CsI:Tl, Me, where Me represents co-doped Sb and Bi. In a particular embodiment, the scintillation crystal may have a cesium iodide host material, a first dopant including a thallium, a second dopant including an antimony, and a third dopant including a bismuth.

20 Claims, 1 Drawing Sheet

(51) Int. Cl.
*G01N 23/046* (2018.01)
*G01N 23/083* (2018.01)

(56) References Cited

U.S. PATENT DOCUMENTS

| | | | |
|---|---|---|---|
| 7,692,153 | B2 | 4/2010 | Shimizu et al. |
| 7,759,645 | B1 | 7/2010 | Brecher et al. |
| 8,507,878 | B1 | 8/2013 | Brecher et al. |
| 8,709,155 | B1 | 4/2014 | Brecher et al. |
| 9,678,223 | B2 | 6/2017 | Totsuka et al. |
| 9,678,233 | B2 | 6/2017 | Abma et al. |
| 9,869,777 | B2 | 1/2018 | Totsuka |
| 10,928,526 | B2 | 2/2021 | Meng et al. |
| 11,340,360 | B2 | 5/2022 | Meng et al. |
| 11,693,133 | B2 | 7/2023 | Meng et al. |
| 2007/0108393 | A1 | 5/2007 | Shoji et al. |
| 2008/0093557 | A1 | 4/2008 | Cooke et al. |
| 2011/0223323 | A1 | 9/2011 | Ohashi et al. |
| 2012/0305778 | A1 | 12/2012 | Menge et al. |
| 2014/0203211 | A1 | 7/2014 | Totsuka et al. |
| 2014/0319362 | A1 | 10/2014 | Yasui et al. |
| 2015/0097543 | A1 | 4/2015 | Kobayashi et al. |
| 2016/0122641 | A1 | 5/2016 | Carey et al. |
| 2017/0355905 | A1 | 12/2017 | Bourret-Courchesne et al. |
| 2019/0361134 | A1* | 11/2019 | Meng .................. C09K 11/62 |
| 2021/0165115 | A1 | 6/2021 | Meng et al. |
| 2022/0260733 | A1 | 8/2022 | Meng et al. |

FOREIGN PATENT DOCUMENTS

| | | |
|---|---|---|
| JP | 2011179703 A | 9/2011 |
| JP | 2011191143 A | 9/2011 |
| JP | 2012131964 A | 7/2012 |
| JP | 2012159394 A | 8/2012 |
| JP | 2013092528 A | 5/2013 |
| JP | 2014522440 A | 9/2014 |
| JP | 2015072606 A | 4/2015 |
| JP | 2016130272 A | 7/2016 |
| JP | 2017129580 A | 7/2017 |
| JP | 2018503706 A | 2/2018 |
| JP | 7097998 B2 | 7/2022 |
| WO | 2013027671 A1 | 2/2013 |
| WO | 2015007229 A1 | 1/2015 |
| WO | 2019227057 A1 | 11/2019 |
| WO | 2024186349 A1 | 9/2024 |

OTHER PUBLICATIONS

Ovechkina E.E. et al., "Multiple doping of CsI:Tl crystals and its effect on afterglow," Radiat Meas., May 2007, pp. 1-10.
Wu, Y. et al., "CsI:Tl+, Yb2+:Ultra-high light yield scintillator with reduced afterglow," CrystEngComm, 2014, vol. 16, pp. 3312-3317.
International Search Report and Written Opinion for PCT/US2019/034020, dated Sep. 18, 2019, 10 pages.
Gektin, A.V. et al., "The Effect of Bi- and Trivalent Cation Impurities on the Luminescence CsI," IEEE Transactions on Nuclear Science, vol. 42, No. 4, Aug. 1995, pp. 285-287.
"New Notation" CRC Handbook of Chemistry and Physics, 2000-2001, p. 62, 81st Edition.
International Search Report and Written Opinion for PCT/US2023/063960, dated Dec. 7, 2023, 10 pages.

* cited by examiner

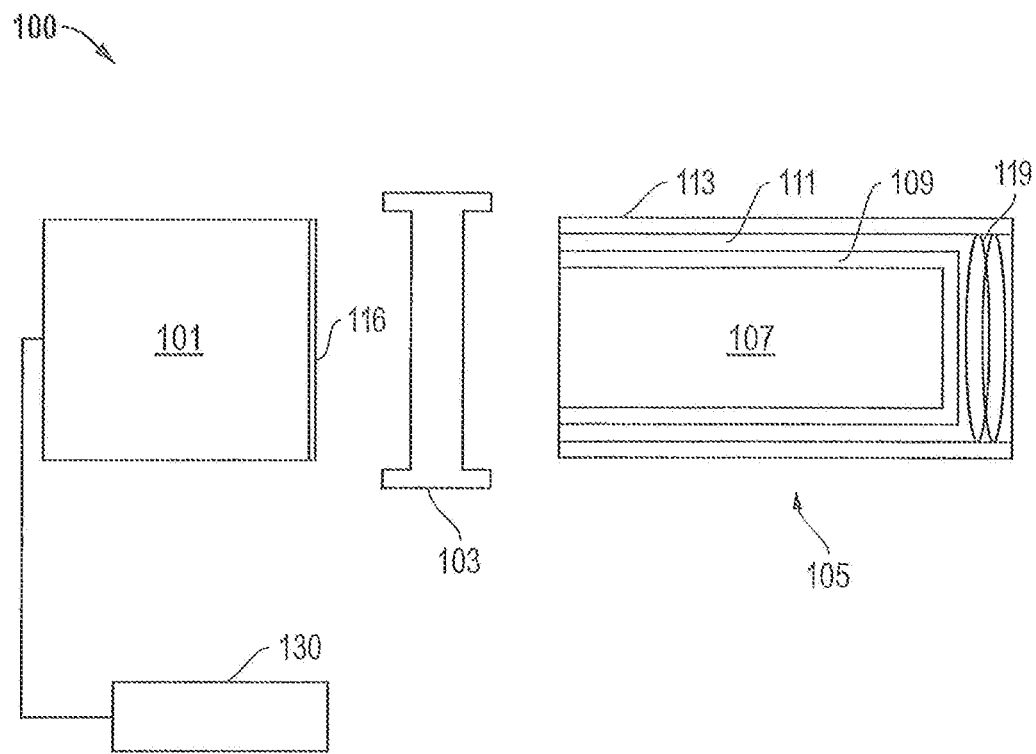

CSI(TI) SCINTILLATOR CRYSTAL INCLUDING CO-DOPANTS ANTIOMY AND BISMUTH TO REDUCE AFTERGLOW, AND A RADIATION DETECTION APPARATUS INCLUDING THE SCINTILLATION CRYSTAL

CROSS-REFERENCE TO RELATED APPLICATION(S)

This application claims priority under 35 U.S.C § 119(e) to U.S. Provisional Application No. 63/269,031, entitled "CsI(Tl) SCINTILLATOR CRYSTAL INCLUDING CO-DOPANTS ANTIOMY AND BISMUTH TO REDUCE AFTERGLOW, AND A RADIATION DETECTION APPARATUS INCLUDING THE SCINTILLATION CRYSTAL," by Fang MENG et al., filed Mar. 8, 2022, which is assigned to the current assignee hereof and is incorporated by reference in its entirety.

FIELD OF THE DISCLOSURE

The present disclosure is directed to scintillation crystals including antimony and bismuth co-dopants and radiation detection apparatuses including such scintillation crystals.

BACKGROUND

Radiation detection apparatuses are used in a variety of applications. For example, scintillators can be used for medical imaging and for well logging in the oil and gas industry as well for the environment monitoring, security applications, and for nuclear physics analysis and applications. CsI:Tl is a scintillation crystal used for radiation detection apparatuses. However, afterglow problems with CsI:Tl limit the functionality, speed, and accuracy in such devices. Further improvements with CsI:Tl scintillation crystals are desired.

BRIEF DESCRIPTION OF THE DRAWINGS

Embodiments are illustrated by way of example and are not limited in the accompanying FIGURES.

FIG. 1 shows an illustration of a radiation detection apparatus in accordance with an embodiment.

Skilled artisans appreciate that elements in the figures are illustrated for simplicity and clarity and have not necessarily been drawn to scale. For example, the dimensions of some of the elements in the FIGURES may be exaggerated relative to other elements to help to improve understanding of embodiments of the invention.

DETAILED DESCRIPTION

The following description in combination with the FIGURES is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, group numbers corresponding to columns within the Periodic Table of the elements use the "New Notation" convention as seen in the CRC Handbook of Chemistry and Physics, $81^{st}$ Edition (2000-2001).

As used herein, the term "group VA element" is intended to mean Bi, Sb, and As in the Periodic Table of the Elements.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A scintillation crystal can include a cesium halide that is co-doped with thallium and another element. The co-doping can lower afterglow and improve energy resolution, light output, another suitable scintillation parameter, or any combination thereof. In an embodiment, the scintillation crystal can include CsI:Tl, Me, where Me represents a co-doped Antimony (Sb) and Bismuth (Bi). As used in this specification, co-doping can include two or more different elements (Tl and one or more other elements), and co-dopant refers to the one or more dopants other than Tl. According to certain embodiments, with particular respect to the composition of the cesium halide, I can include impurities without affecting the performance of the crystal.

According to certain embodiments, with particular respect to the composition of the Tl, Tl can include the concentration within the scintillation crystal CsI:Tl, Me. In certain embodiments, Tl can have a concentration of at least $1 \times 10^{-4}$ mol % Tl, at least $1 \times 10^{-3}$ mol % Tl, or at least 0.01 mol % Tl. In another embodiment, Tl has a concentration no greater than 10 mol % Tl, no greater than 5 mol % Tl, no greater than 0.9 mol % Tl, or no greater than 0.2 mol % Tl. In a particular embodiment, Tl has a concentration in a range of $1 \times 10^{-4}$ mol % to 10 mol %, $1 \times 10^{-3}$ mol % to 0.9 mol %, or 0.01 mol % to 0.2 mol %. It will be appreciated that the mol % of Tl in the scintillation crystal may be any value between any of the minimum and maximum values noted above. It will be further appreciated that the mol % of Tl in the scintillation crystal may be any value within a range between any of the minimum and maximum values noted above.

According to certain embodiments, with particular respect to the composition of the Me, Me can include the concentration within the scintillation crystal CsI:Tl, Me. In an embodiment when the co-dopant is Sb and Bi, the dopant concentration of the Sb in the scintillation crystal is at least $2 \times 10^{-6}$ mol % or 0.02 ppm or is at least $1 \times 10^{-5}$ mol %. In another embodiment, the concentration of the Sb in the scintillation crystal is no greater than $1.3 \times 10^{-4}$ mol %, no greater than $1 \times 10^{-4}$ mol %. In a particular embodiment, the concentration of the Sb in the scintillation crystal is in a range of $2 \times 10^{-6}$ mol % to $1.3 \times 10^{-4}$ mol %. In an embodiment when the co-dopant is Sb and Bi, the dopant concentration of the Bi in the scintillation crystal is at least $2.7 \times 10^{-6}$ mol % or 0.027 ppm or is at least $1 \times 10^{-5}$ mol %. In another embodiment, the concentration of the Bi in the scintillation crystal is no greater than $5.2 \times 10^{-4}$ mol %, no greater than $1 \times 10^{-4}$ mol %. In a particular embodiment, the concentration of the Bi in the scintillation crystal is in a range of $2.7 \times 10^{-6}$ mol % to $5.2 \times 10^{-4}$ mol %. It will be appreciated that the mol % of Me in the scintillation crystal may be any value between any of the minimum and maximum values noted above. It will be further appreciated that the mol % of Me in the scintillation crystal may be any value within a range between any of the minimum and maximum values noted above. All of the preceding dopant concentrations are for dopant concentrations in the crystal. In a particular embodiment, the co-dopant is one of a trivalent or pentavalent element. In another embodiment, the co-dopant is a trivalent or pentavalent antimony and bismuth, or any combinations thereof. Even though the co-dopants are added to the CsI:Tl scintillation crystal in relatively small amounts, the co-dopants unexpectedly and advantageously can affect the after glow and light output without disruption to the growth of the crystal.

According to certain embodiments, the concentration of dopants in the crystal may or may not be different from the concentrations of dopants in the melt from which the scintillation crystal is formed. The concentrations of Tl and Sb and Bi co-dopants in a melt in forming the crystal can include any of the values as previously described.

According to still other embodiments, when selecting a co-dopant, different considerations may determine which particular elements are better suited for improving particular scintillation parameters as compared to other elements. The description below is to be used as general guidance and not construed as limiting particular scintillation parameters to particular co-dopants.

According to yet other embodiments, light output of the scintillation crystal can be increased with a co-dopant, Me, as compared to the composition of the scintillation crystal without the co-dopant. In an embodiment, the scintillation crystal with the co-dopant has a light output that is at least 1%, at least 5%, at least 9% more than a light output of a CsI:Tl crystal without the co-dopant when the light output of the scintillation crystal with the co-dopant and the CsI:Tl crystal without the co-dopant are measured at 22° C. and exposed to gamma radiation having an energy of 662 keV.

According to yet other embodiments, the afterglow of the scintillation crystal can be reduced with a co-dopant, Me, as compared to the composition of the scintillation crystal without the co-dopant. 'Afterglow' is the ratio of the scintillation light intensity at a time after exposure to x-rays to a time during exposure to x-rays. In certain embodiments, the scintillation crystal with the co-dopant has an afterglow that is at least 20%, at least 30%, at least 45%, at least 50% less than an afterglow of a CsI:Tl crystal without the co-dopant when the co-doped scintillation crystal and CsI:Tl crystal without the co-dopant were coupled to silicon photodiodes and exposed to an X-ray beam (120 keV, tungsten target).

The scintillation crystal can be formed using any one of a variety of crystal growing techniques including Bridgman, Czochralski, Kyropoulos, Edge-defined Film-fed Growth (EFG), Stepanov, Gradient-Freeze, Vapor Deposition, Plasma Deposition or the like. The starting materials include a cesium halide and halides of the dopants. In an embodiment, the starting materials can include CsI and Tl, and depending on the co-dopant, the starting material can include any one or more of $SbI_3$, $SbI_5$, $BiI_3$, $BiI_5$, $AsI_3$, or elemental metals or the like. After determining a desired composition of the scintillation crystal, the segregation coefficients for the dopants with respect to the base material (e.g., CsI) can be used to determine amounts of starting materials to use in the melt. Crystal growing conditions can the same as used in forming CsI:Tl or may have relatively small changes to optimize the crystal formation process.

Any of the scintillation crystals as previously described can be used in a variety of applications. Exemplary applications include gamma ray spectroscopy, isotope identification, Single Photon Emission Computer Tomography (SPECT) or Positron Emission Tomography (PET) analysis, x-ray imaging, oil well-logging detectors, and detecting the presence of radioactivity. In one embodiment, an X-ray imaging device can inspect more than 300 bags per hour, such as more than 400 bags per hour, or more than 500 bags per hour utilizing the scintillation crystal described above. In another embodiment, a computed tomography device can inspect more than 1000 bags per hour, such as more than 1500 bags per hour, or more than 2000 bags per hour utilizing the scintillation crystal described above.

The scintillation crystal can be used for other applications, and thus, the list is merely exemplary and not limiting. A couple of specific applications are described below.

FIG. 1 illustrates an embodiment of a radiation detection apparatus 100 that can be used for gamma ray analysis, such as Single Photon Emission Computer Tomography (SPECT) or step-through X-ray machine. As shown in FIG. 1 and in accordance with embodiments described herein, the radiation detection apparatus 100 may include a photosensor 101, an optical interface 103, and a scintillation device 105. Although the photosensor 101, the optical interface 103, and the scintillation device 105 are illustrated in FIG. 1 as being separate from each other, it will be appreciated that, according to certain embodiments, photosensor 101 and the scintillation device 105 can be coupled to the optical interface 103, with the optical interface 103 disposed between the photosensor 101 and the scintillation device 105. According to still other embodiments, the scintillation device 105 and the photosensor 101 can be optically coupled to the optical interface 103 with other known coupling methods, such as the use of an optical gel or bonding agent, or directly through molecular adhesion of optically coupled elements.

According to yet other embodiments, the photosensor 101 may be a photomultiplier tube (PMT), a semiconductor-based photomultiplier, or a hybrid photosensor. The photosensor 101 can receive photons emitted by the scintillation device 105, via an input window 116, and produce electrical pulses based on numbers of photons that it receives. The photosensor 101 is electrically coupled to an electronics module 130. The electrical pulses can be shaped, digitized, analyzed, or any combination thereof by the electronics module 130 to provide a count of the photons received at the photosensor 101 or other information. The electronics module 130 can include an amplifier, a pre-amplifier, a discriminator, an analog-to-digital signal converter, a photon counter, a pulse shape analyzer or discriminator, another electronic component, or any combination thereof. The photosensor 101 can be housed within a tube or housing made of a material capable of protecting the photosensor 101, the electronics module 130, or a combination thereof, such as a metal, metal alloy, other material, or any combination thereof.

The scintillation device 105 may include a scintillation crystal 107 and can be any one of the scintillation crystals previously described that are represented by a general formula of CsX:Tl, Me, where X represents a halogen, and Me represents co-doped Sb and Bi. The scintillation crystal 107 is substantially surrounded by a reflector 109. In one embodiment, the reflector 109 can include polytetrafluoroethylene (PTFE), another material adapted to reflect light emitted by the scintillation crystal 107, or a combination thereof. In an illustrative embodiment, the reflector 109 can be substantially surrounded by a shock absorbing member 111. The scintillation crystal 107, the reflector 109, and the shock absorbing member 111 can be housed within a casing 113.

In one embodiment, the scintillation crystal can include a cesium iodide host material, a first dopant, a second dopant, and a third dopant. The first dopance can include a thallium with a molar concentration of less than 10%. The second dopant can include an antimony with a concentration in the scintillator crystal of greater than 0.02 ppm and no greater than 1.3 ppm. The third dopant can include bismuth where a concentration in the scintillator crystal of greater than 0.027 ppm and no greater than 5.2 ppm. The scintillation crystal described above is exemplary. In such a crystal, the scintillator crystal can have a reduced afterglow below 0.1% at 100 ms after exposure to x-rays with an absolute light output greater than 55000 ph/MeV. In another embodiment, the scintillator crystal can have a reduced afterglow below 0.1% at 100 ms after exposure to x-rays with an absolute light output greater than or equal to 55300 ph/MeV. In such a crystal, the scintillator crystal can have a reduced afterglow below 0.1% at 100 ms after exposure to x-rays with an absolute light output greater than or equal to 55500 ph/MeV. In another embodiment, the scintillator crystal can have a reduced afterglow below 0.1% at 100 ms after exposure to x-rays with an absolute light output no greater than 65000 ph/MeV. The light output can be measured using the Single Photon-Electron (SPE) method.

In this method, the time-integrated scintillation light output signal is compared to the time-integrated signal from a single photon. The equation to determine the scintillator light output (L) in units of photons per unit x-ray energy is:

$$L = \frac{Q_{x-ray}}{q_{pe}\,\eta\,E_{x-ray}},$$

where $Q_{x-ray}$ is the measured charge in an electrical pulse created by the photosensor detecting scintillation light produced by a single x-ray or gamma-ray, $q_{pe}$ is the measured charge from the pulse of one detected photoelectron created by the photosensor. This is the same as the signal from the detection of a single scintillation photon. $\eta$ is the average quantum efficiency of the photosensor weighted by the emission spectrum of the scintillator, and $E_{x-ray}$ is the known energy of the x-ray (or gamma-ray) deposited in the scintillator.

An example measure of light output using the SPE method is given for a standard CsI(Tl) crystal below. First, the average charge in a pulse created by the photosensor from the scintillation light produced by CsI(Tl) from energy deposited by a 662 keV gamma-ray is measured (for a standard CsI(Tl) crystal, $E_{x-ray}$=0.662 MeV). To find the average charge in a pulse, the time-integrated voltage of the pulse is measured, with the charge in units of pV-s. For example, for an un-codoped CsI(Tl) standard crystal, the measurement is $Q_{x-ray}$=44500 pV-s. Next, a spectrum is obtained using a signal digitizer of single photo-electrons from a photomultiplier tube (PMT) using a Tektronix MSO64 signal digitizer and a Hamamatsu R6132-100 (PMT) set to 1200 V. For example, for an un-codoped CsI(Tl) standard crystal, the $q_{pe}$=8.4 pV-s created from a single photo-electron. Next, the weighted average of the quantum efficiency is calculated from the known emission spectrum of the crystal and the quantum efficiency versus wavelength curve provided by the PMT manufacturer. The equation is:

$$\eta = \frac{\int_{\lambda 1}^{\lambda 2} I(\lambda) * QE(\lambda) d\lambda}{\int_{\lambda 1}^{\lambda 2} I(\lambda) d\lambda},$$

where, $\lambda$ is wavelength of the scintillation light, $I(\lambda)$ is the wavelength dependent emission intensity of CsI(Tl), $QE(\lambda)$ is the manufacturer-provided quantum efficiency versus wavelength curve, $\lambda 1$ is the shortest wavelength of emission, and $\lambda 2$ is the longest wavelength of emission. For example, for an un-codoped CsI(Tl) standard crystal measured with a Hamamatsu R6132-100 PMT, $\eta$=0.146. Finally, the values of $Q_{x-ray}$=44500 pV-s, $E_{x-ray}$=0.662 MeV, $q_{pe}$=8.4 pV-s, and $\eta$=0.146, are inserted in the equation for light output to obtain the light output measurement. For example, for an un-codoped CsI(Tl) standard crystal L=54800 photons/MeV.

The scintillation device 105 may include at least one stabilization mechanism adapted to reduce relative movement between the scintillation crystal 107 and other elements of the radiation detection apparatus 100, such as the optical interface 103, the casing 113, the shock absorbing member 111, the reflector 109, or any combination thereof. The stabilization mechanism may include a spring 119, an elastomer, another suitable stabilization mechanism, or a combination thereof. The stabilization mechanism can be adapted to apply lateral forces, horizontal forces, or a combination thereof, to the scintillation crystal 107 to stabilize its position relative to one or more other elements of the radiation detection apparatus 100.

As illustrated in FIG. 1, the optical interface 103 may be adapted to be coupled between the photosensor 101 and the scintillation device 105. The optical interface 103 may also be adapted to facilitate optical coupling between the photosensor 101 and the scintillation device 105. The optical interface 103 can include a polymer, such as a silicone rubber, that is polarized to align the reflective indices of the scintillation crystal 107 and the input window 116. In other embodiments, the optical interface 103 can include gels or colloids that include polymers and additional elements.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1. A scintillation crystal can include: a cesium iodide host material; a first dopant can include a thallium, a molar concentration of said first dopant being less than 10%, a second dopant can include an antimony, where a concentration of the second dopant in the scintillator crystal is greater than 0.02 ppm and no greater than 1.3 ppm and a third dopant can include bismuth, where a concentration of the third dopant in the scintillator crystal is greater than 0.027 ppm and no greater than 5.2 ppm, where the scintillator crystal has a reduced afterglow below 0.1% at 100 ms after exposure to x-rays, and where the absolute light output is greater than 55000 ph/MeV.

Embodiment 2. A scintillator crystal can include: a cesium iodide host material, a first dopant can include a thallium, a molar concentration of said first dopant being less than 10%, a second dopant can include an antimony, where a concentration of the second dopant in the scintillator crystal is greater than 0.02 ppm and no greater than 1.3 ppm, and a third dopant can include bismuth, where a concentration of the third dopant in the scintillator crystal is greater than 0.027 ppm and no greater than 5.2 ppm, where the scintillator crystal has a reduced afterglow below 0.2% at 500 ms after exposure to x-rays, and where the absolute light output is greater than 55000 ph/MeV.

Embodiment 3. A radiation detection apparatus can include: a housing; and a scintillator within the housing, the scintillator can include: a cesium iodide host material, a first dopant can include a thallium, a molar concentration of said first dopant being less than 10%, a second dopant can include an antimony, where a concentration of the second dopant in the scintillator crystal is greater than 0.02 ppm and no greater than 1.3 ppm, and a third dopant can include bismuth, where a concentration of the third dopant in the scintillator crystal is greater than 0.027 ppm and no greater than 5.2 ppm, where the scintillator crystal has a reduced afterglow below 0.1% at 100 ms after exposure to x-rays, and where the absolute light output is greater than 55000 ph/MeV.

Embodiment 4. The scintillator crystal of embodiment 1, wherein the absolute light output of the scintillator crystal is greater than 55300 ph/MeV.

Embodiment 5. The scintillator crystal of embodiment 1, wherein the absolute light output of the scintillator crystal is greater than 55400 ph/MeV.

Embodiment 6. The scintillator crystal of embodiment 1, wherein the absolute light output of the scintillator crystal is greater than 55500 ph/MeV.

Embodiment 7. The scintillator crystal of embodiment 1, where the scintillator crystal has a reduced afterglow below 0.09% at 100 ms after exposure to x-rays.

Embodiment 8. The scintillator crystal of embodiment 1, where the scintillator crystal has a reduced afterglow below 0.08% at 100 ms after exposure to x-rays.

Embodiment 9. The scintillator crystal of embodiment 2, where the scintillator crystal has a reduced afterglow below 0.05% at 500 ms after exposure to x-rays.

Embodiment 10. The scintillator crystal of embodiment 2, where the scintillator crystal has a reduced afterglow below 0.07% at 500 ms after exposure to x-rays.

Embodiment 11. The scintillator crystal of embodiment 2, where the scintillator crystal has a reduced afterglow below 0.09% at 500 ms after exposure to x-rays.

Embodiment 12. The scintillator crystal of embodiment 2, where the scintillator crystal has a reduced afterglow below 0.1% at 500 ms after exposure to x-rays.

Embodiment 13. The scintillator crystal of embodiment 2, where the second dopant can include trivalent antimony and the third dopant can include trivalent bismuth.

Embodiment 14. The scintillator crystal of embodiment 2, where the second dopant can include pentavalent antimony and the third dopant can include pentavalent bismuth.

Embodiment 15. The radiation detection apparatus of embodiment 3, where the radiation detection apparatus is capable of inspecting more than 300 bags per hour during an X-ray irradiation.

Embodiment 16. The radiation detection apparatus of embodiment 3, where the radiation detection apparatus is capable of inspecting more than 1000 bags per hour during a Computed tomography irradiation.

Embodiment 17. The radiation detection apparatus of embodiment 3, where the afterglow in the scintillator crystal is reduced by at least 83% or at least 90% or at least 92% as compared to an un-doped scintillator crystal.

Embodiment 18. The radiation detection apparatus of embodiment 3, where the afterglow in the scintillator crystal is reduced by at least 90% as compared to an un-doped scintillator crystal.

Embodiment 19. The radiation detection apparatus of embodiment 3, where the afterglow in the scintillator crystal is reduced by at least 92% as compared to an un-doped scintillator crystal.

Embodiment 20. The radiation detection apparatus of embodiment 3, where the radiation detection apparatus is one of a Single Photon Emission Computer Tomography (SPECT) apparatus, a Positron Emission Tomography (PET) apparatus, an x-ray imaging apparatus, and an oil well-logging detector.

EXAMPLES

The concepts described herein will be further described in the Examples, which do not limit the scope of the invention described in the claims. The Examples demonstrate performance of scintillation crystals of different compositions. Numerical values as disclosed in this Examples section may be averaged from a plurality of readings, approximated, or rounded off for convenience. Samples were formed using a vertical Bridgman crystal growing technique.

Scintillation crystal samples CS1 and S2-S16 were formed to compare afterglow and absolute light output of the co-doped samples to a CsI:Tl standard. The compositions of the scintillation crystal samples are listed in Table 1. Further, each sample CS1 and S2-S16 was tested to determine afterglow (AG) and absolute light output. CS1 and S2-S16 contained approximately 0.392 mol % Tl. For afterglow measurements, the samples were coupled to silicon photodiodes and exposed to an X-ray beam (120 keV, tungsten target). The photodiode signal was sampled at 100 ms and 500 ms following X-ray beam shutoff. The ratio of these signal intensities to the signal intensity during X-ray beam exposure is defined as the afterglow (AG). Absolute light output testing was performed at room temperature (approximately 22° C.) by exposing the scintillation crystals to $^{137}$Cs and using a photomultiplier tube and multichannel analyzer to obtain a spectrum. The results of the performance testing for the scintillation crystal samples CS1 and S2-S16 are also listed in Table 1.

TABLE 1

Standard, Sb, and Bi Compositions and Performance

| Sample | Composition | Sb in Melt (mol %) | Bi in Melt (mol %) | Sb in Crystal (ppm) | Bi in Crystal (ppm) | AG at 100 ms (%) | AG at 500 ms (%) | Absolute light Output (ph/MeV) |
|---|---|---|---|---|---|---|---|---|
| CS1 | CsI:Tl, (standard) | — | | — | | 0.43 | 0.26 | 53500 |
| S2 | CsI:Tl, $Sb^{3+},Bi^{3}$ | 0.03 | 0.006 | 1.12 | 0.992 | 0.0724 | 0.0519 | 58400 |
| S3 | CsI:Tl, $Sb^{3+},Bi^{3}$ | 0.03 | 0.012 | 1.3 | 12 | 0.0354 | 0.0247 | 53700 |
| S4 | CsI:Tl, $Sb^{3+},Bi^{3}$ | 0.03 | 0.006 | 0.7 | 5.14 | 0.0269 | 0.0191 | 57700 |
| S5 | CsI:Tl, $Sb^{3+},Bi^{3}$ | 0.12 | 0.006 | 5.2 | 4.1 | 0.0654 | 0.0482 | 52800 |
| S6 | CsI:Tl, $Sb^{3+},Bi^{3}$ | 0.06 | 0.009 | 1.35 | 13 | 0.0229 | 0.0221 | 50400 |
| S7 | CsI:Tl, $Sb^{3+},Bi^{3}$ | 0.03 | 0.012 | 3.52 | 5.0 | 0.0434 | 0.0382 | 46800 |
| S8 | CsI:Tl, $Sb^{3+},Bi^{3}$ | 0.03 | 0.006 | 0.81 | 0.18 | 0.0352 | 0.0218 | 56300 |
| S9 | CsI:Tl, $Sb^{3+},Bi^{3}$ | 0.03 | 0.006 | 0.26 | 0.63 | 0.0515 | 0.0327 | 56300 |
| S10 | CsI:Tl, $Sb^{3+},Bi^{3}$ | 0.12 | 0.006 | 0.287 | 0.646 | 0.0706 | 0.0420 | 55300 |
| S11 | CsI:Tl, $Sb^{3+},Bi^{3}$ | 0.12 | 0.006 | 0.472 | 0.746 | 0.0599 | 0.0344 | 55500 |
| S12 | CsI:Tl, $Sb^{3+},Bi^{3}$ | 0.12 | 0.006 | 0.63 | 0.95 | 0.0674 | 0.0289 | 55500 |
| S13 | CsI:Tl, $Sb^{3+},Bi^{3}$ | 0.12 | 0.006 | 0.642 | 0.869 | 0.0358 | 0.0278 | 55000 |
| S14 | CsI:Tl, $Sb^{3+},Bi^{3}$ | 0.12 | 0.006 | 4.591 | 2.311 | 0.0339 | 0.0228 | 51900 |
| S15 | CsI:Tl, $Sb^{3+},Bi^{3}$ | 0.12 | 0.006 | 5.716 | 2.695 | 0.0307 | 0.0213 | 50900 |
| S16 | CsI:Tl, $Sb^{3+},Bi^{3}$ | 0.12 | 0.006 | 0.741 | 1.934 | 0.0179 | 0.0118 | 57600 |

As shown in the table, the Sb and Bi co-doped sample has a lower afterglow as compared to the undoped sample while maintaining the overall light output at certain concentrations, between 0.02 ppm and 1.3 ppm for Sb and between 0.027 and 5.2 for Bi, as seen in S2, S4, S8-S12, and S16. Certain amounts of the co-dopant as described in detail above are needed to show a reduction in afterglow of at least 83% at 100 ms and 80% at 500 ms as compared to the undoped sample while maintaining the absolute light output above 55000 ph/MeV and within 1%-9% of the standard. In another embodiment, the co-dopant as described in detail above are needed to show a reduction in afterglow of at least 83% at 100 ms and 80% at 500 ms as compared to the undoped sample while maintaining the absolute light output above or equal to 55300 ph/MeV. In another embodiment, the co-dopant as described in detail above are needed to show a reduction in afterglow of at least 83% at 100 ms and 80% at 500 ms as compared to the undoped sample while maintaining the absolute light output above or equal to 55500 ph/MeV. However, when the concentration of Sb and Bi are outside the ranges as described above, as seen in S3, S5-S7, S13, S14, and S15, the absolute light output decreases below 53500 ph/MeV negatively affecting performance.

Note that not all of the activities described above in the general description of the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A scintillator crystal comprising:
a cesium iodide host material;
a first dopant comprising a thallium, a molar concentration of said first dopant being less than 10%;
a second dopant comprising an antimony, wherein a concentration of the second dopant in the scintillator crystal is greater than 0.02 ppm and no greater than 1.3 ppm; and
a third dopant comprising bismuth, wherein a concentration of the third dopant in the scintillator crystal is greater than 0.027 ppm and no greater than 5.2 ppm, wherein the scintillator crystal has a reduced afterglow below 0.1% at 100 ms, and wherein an absolute light output is greater than 55000 ph/MeV.

2. The scintillator crystal of claim 1, wherein the absolute light output of the scintillator crystal is greater than 55300 ph/MeV.

3. The scintillator crystal of claim 1, wherein the absolute light output of the scintillator crystal is greater than 55400 ph/MeV.

4. The scintillator crystal of claim 1, wherein the absolute light output of the scintillator crystal is greater than 55500 ph/MeV.

5. The scintillator crystal of claim 1, wherein the reduced afterglow of the scintillator crystal is below 0.09% at 100 ms.

6. The scintillator crystal of claim 1, wherein the reduced afterglow of the scintillator crystal is below 0.08% at 100 ms.

7. A scintillator crystal comprising:
a cesium iodide host material;
a first dopant comprising a thallium, a molar concentration of said first dopant being less than 10%;
a second dopant comprising an antimony, wherein a concentration of the second dopant in the scintillator crystal is greater than 0.02 ppm and no greater than 1.3 ppm; and
a third dopant comprising bismuth, wherein a concentration of the third dopant in the scintillator crystal is greater than 0.027 ppm and no greater than 5.2 ppm, wherein the scintillator crystal has a reduced afterglow below 0.2% at 500 ms, and wherein a absolute light output is greater than 55000 ph/MeV.

8. The scintillator crystal of claim 7, wherein the reduced afterglow of the scintillator crystal is below 0.05% at 500 ms.

9. The scintillator crystal of claim 7, wherein the reduced afterglow of the scintillator crystal is below 0.07% at 500 ms.

10. The scintillator crystal of claim 7, wherein the reduced afterglow of the scintillator crystal is below 0.09% at 500 ms.

11. The scintillator crystal of claim 7, wherein the reduced afterglow of the scintillator crystal is below 0.1% at 500 ms.

12. The scintillator crystal of claim 7, wherein the second dopant comprises trivalent antimony and the third dopant comprises trivalent bismuth.

13. The scintillator crystal of claim 7, wherein the second dopant comprises pentavalent antimony and the third dopant comprises pentavalent bismuth.

14. A radiation detection apparatus comprising:
a housing; and
a scintillator within the housing, the scintillator comprising:
a cesium iodide host material;
a first dopant comprising a thallium, a molar concentration of said first dopant being less than 10%; and
a second dopant comprising an antimony, wherein a concentration of the second dopant in the scintillator crystal is greater than 0.02 ppm and no greater than 1.3 ppm; and
a third dopant comprising bismuth, wherein a concentration of the third dopant in the scintillator crystal is greater than 0.027 ppm and no greater than 5.2 ppm, wherein the scintillator crystal has a reduced afterglow below 0.1% at 100 ms, and wherein h absolute light output is greater than 55000 ph/MeV.

15. The radiation detection apparatus of claim 14, wherein the radiation detection apparatus is capable of inspecting more than 300 bags per hour during an X-ray irradiation.

16. The radiation detection apparatus of claim 14, wherein the radiation detection apparatus is capable of inspecting more than 1 000 bags per hour during a Computed tomography irradiation.

17. The radiation detection apparatus of claim 14, wherein the afterglow in the scintillator crystal is reduced by at least 83% as compared to an un-doped scintillator crystal.

18. The radiation detection apparatus of claim 14, wherein the afterglow in the scintillator crystal is reduced by at least 90% as compared to an un-doped scintillator crystal.

19. The radiation detection apparatus of claim 14, wherein the afterglow in the scintillator crystal is reduced by at least 92% as compared to an un-doped scintillator crystal.

20. The radiation detection apparatus of claim 14, wherein the radiation detection apparatus is one of a Single Photon Emission Computer Tomography (SPECT) apparatus, a Positron Emission Tomography (PET) apparatus, an x-ray imaging apparatus, and an oil well-logging detector.

* * * * *